United States Patent
Dagenais et al.

(10) Patent No.: US 9,260,951 B2
(45) Date of Patent: *Feb. 16, 2016

(54) VARYING PORE SIZE IN A WELL SCREEN

(71) Applicant: HALLIBURTON ENERGY SERVICES, INC., Houston, TX (US)

(72) Inventors: Peter Dagenais, The Colony, TX (US); Michael L. Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,354

(22) Filed: Dec. 13, 2012

(65) Prior Publication Data

US 2013/0098614 A1 Apr. 25, 2013

Related U.S. Application Data

(63) Continuation of application No. 13/010,812, filed on Jan. 21, 2011, now Pat. No. 8,919,451.

(51) Int. Cl.
*E21B 43/08* (2006.01)
*E21B 43/14* (2006.01)
*E21B 43/10* (2006.01)
*G05D 5/06* (2006.01)
*H01F 1/03* (2006.01)

(52) U.S. Cl.
CPC .............. *E21B 43/08* (2013.01); *E21B 43/108* (2013.01); *E21B 43/14* (2013.01); *G05D 5/06* (2013.01); *H01F 1/0308* (2013.01)

(58) Field of Classification Search
USPC ............ 166/56, 157, 227–236; 175/312, 314, 175/315
See application file for complete search history.

(56) References Cited

U.S. PATENT DOCUMENTS

| | | | | |
|---|---|---|---|---|
| 3,477,948 | A | * | 11/1969 | Inoue ........................... 210/695 |
| 3,908,256 | A | * | 9/1975 | Smith, III ................... 140/71 R |
| 5,293,935 | A | | 3/1994 | Arterbury et al. |
| 5,823,260 | A | | 10/1998 | McConnell et al. |
| 6,305,468 | B1 | * | 10/2001 | Broome et al. ............... 166/233 |
| 6,610,186 | B1 | | 8/2003 | Mayer et al. |
| 7,188,678 | B2 | | 3/2007 | Richard et al. |

(Continued)

FOREIGN PATENT DOCUMENTS

| | | |
|---|---|---|
| CN | 1040859 A | 3/1990 |
| CN | 2683232 Y | 3/2005 |

(Continued)

OTHER PUBLICATIONS

IFW Dreseden, Institute for Metallic Materials, "Magnetic Shape Memory films", online article, accessed Dec. 16, 2010, 8 pages.

(Continued)

*Primary Examiner* — Cathleen Hutchins
*Assistant Examiner* — Ronald Runyan
(74) *Attorney, Agent, or Firm* — Locke Lord LLP; Peter Fallon; Daniel J. Fiorello

(57) ABSTRACT

A method can include applying a magnetic field to a well screen, thereby varying sizes of pores via which fluid flows through the well screen. A well screen can include a magnetic shape memory material having a dimension which changes in response to application of a magnetic field. Restriction to flow through the well screen can vary in response to the change in dimension of the magnetic shape memory material.

29 Claims, 5 Drawing Sheets

(56) References Cited

U.S. PATENT DOCUMENTS

| | | | |
|---|---|---|---|
| 7,638,921 B2 | 12/2009 | Browne et al. | |
| 7,964,290 B2 | 6/2011 | Mullner et al. | |
| 2003/0196808 A1* | 10/2003 | Blauch et al. | 166/300 |
| 2004/0060695 A1 | 4/2004 | Castano-Mears et al. | |
| 2006/0113088 A1 | 6/2006 | Richard et al. | |
| 2007/0069427 A1* | 3/2007 | Long et al. | 264/430 |
| 2008/0017578 A1 | 1/2008 | Childs et al. | |
| 2011/0064965 A1* | 3/2011 | Mullner et al. | 428/613 |
| 2011/0073307 A1* | 3/2011 | Miller et al. | 166/268 |
| 2012/0186819 A1 | 7/2012 | Dagenais et al. | |

FOREIGN PATENT DOCUMENTS

| | | |
|---|---|---|
| GB | 2015900 A | 9/1979 |
| WO | 0194744 A1 | 12/2001 |
| WO | WO-2007/025206 A2 | 3/2007 |

OTHER PUBLICATIONS

Materials Science Forum, "Recent Developments in Ni—Mn—Ga Foam Research" vol. 635, pp. 119-124, dated 2010, 6 pages.

National Science Foundation, "Metallic Shape-Memory Foam Shows Giant Response to Magnetic Fields", Online article, dated Oct. 16, 2009, 3 pages.

Office Action issued Dec. 7, 2012 for U.S. Appl. No. 13/010,812, 14 pages.

Office Action issued Jun. 6, 2013 for U.S. Appl. No. 13/010,812, 16 pages.

Search Report issued Aug. 17, 2012 for International Application No. PCT/US12/21023, 5 pages.

Written Opinion issued Aug. 17, 2012 for International Application No. PCT/US12/21023, 7 pages.

J. Tellinen et al., "Basic Properties of Magnetic Shape Memory Actuators," 8th International Conference Actuator 2002, Bremen, Germany, Jun. 12, 2002, 4 pages.

Singapore International Search Report with Written Opinion issued Jul. 3, 2014 for SG Patent Application No. 2013051834, 12 pages.

Office Action issued Apr. 22, 2014 for U.S. Appl. No. 13/010,812, 18 pages.

Extended European Search Report dated Oct. 1, 2015, issued during the prosecution of European Patent Application No. 12736311.7 (6 pages).

* cited by examiner

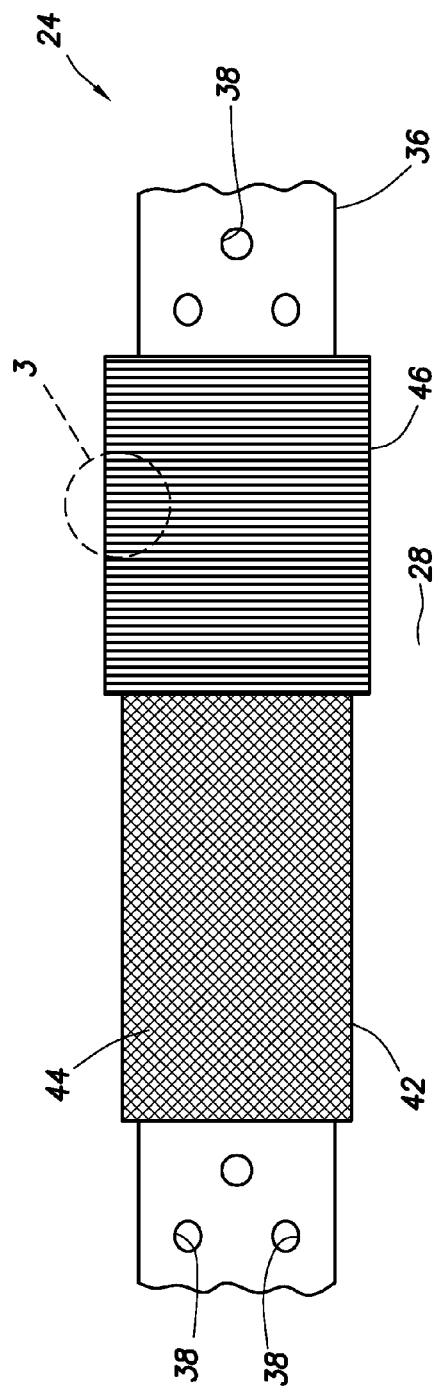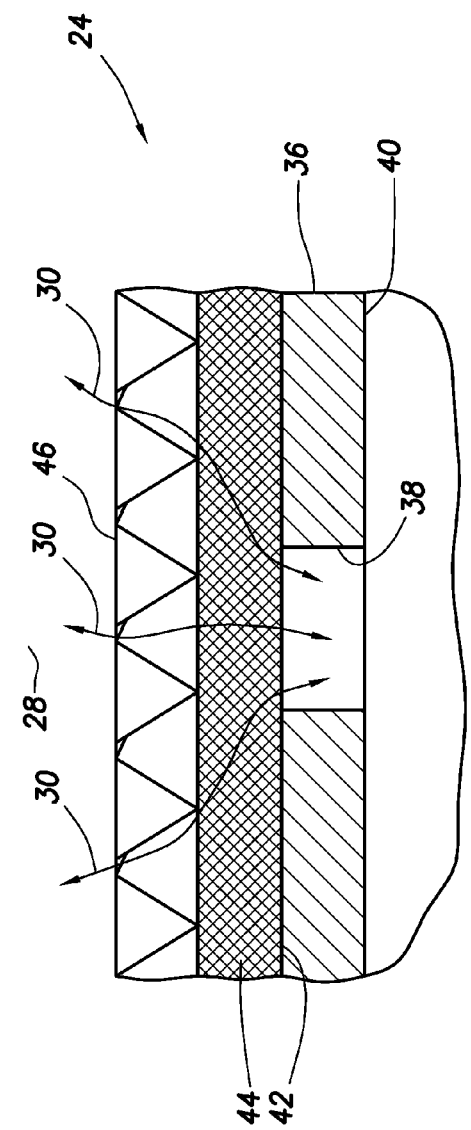
FIG.2
FIG.3

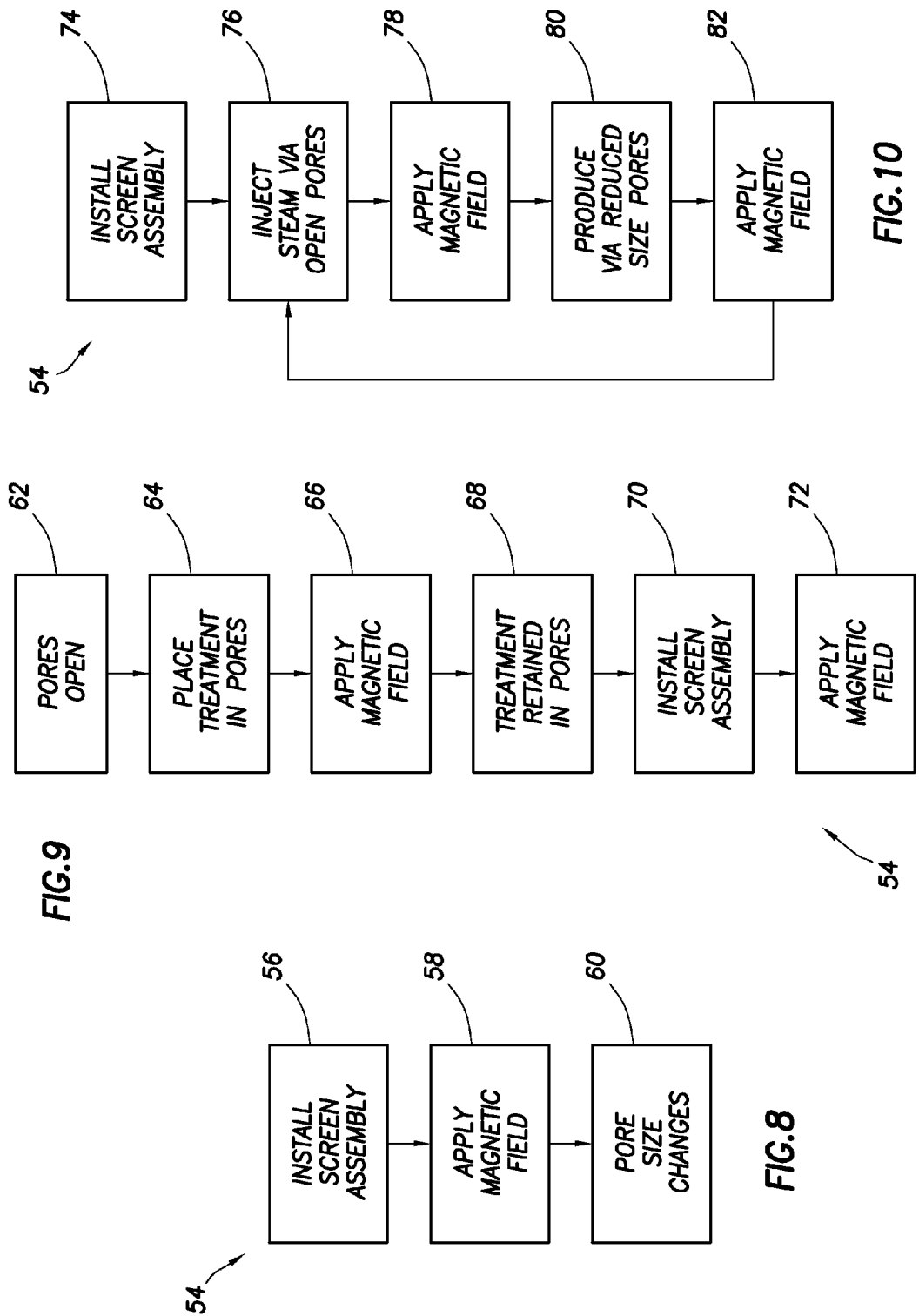

VARYING PORE SIZE IN A WELL SCREEN

CROSS-REFERENCE TO RELATED APPLICATION

The present application is a continuation of U.S. application Ser. No. 13/010,812 filed on 21 Jan. 2011. The entire disclosure of this prior application is incorporated herein by this reference.

BACKGROUND

This disclosure relates generally to equipment utilized and operations performed in conjunction with a subterranean well and, in an example described below, more particularly provides for varying pore size in a well screen.

It can be beneficial to perform certain operations with well screens. Therefore, improvements in operations with well screen are needed in the art.

SUMMARY

In the disclosure below, a well system, method and well screen are provided which bring improvements to the art of well operations utilizing well screens. One example is described below in which flow resistance through a well screen can be varied. Another example is described below in which a substance can be selectively released from a well screen.

In one aspect, this disclosure provides to the art a method which can include applying a magnetic field to a well screen, thereby varying sizes of pores via which fluid flows through the well screen.

In another aspect, this disclosure provides to the art a well screen which can include a magnetic shape memory material having a dimension which changes in response to application of a magnetic field. Restriction to flow through the well screen can vary in response to the change in dimension of the magnetic shape memory material.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIG. 2 is a representative enlarged scale partially cut away elevational view of a well screen which may be used in the well system and method of FIG. 1.

FIG. 3 is a further enlarged scale representative cross-sectional view of the well screen.

FIG. 8 is a representative flowchart for the method.

FIGS. 9 & 10 are representative flowcharts for variations of the method.

DETAILED DESCRIPTION

Figure 1:
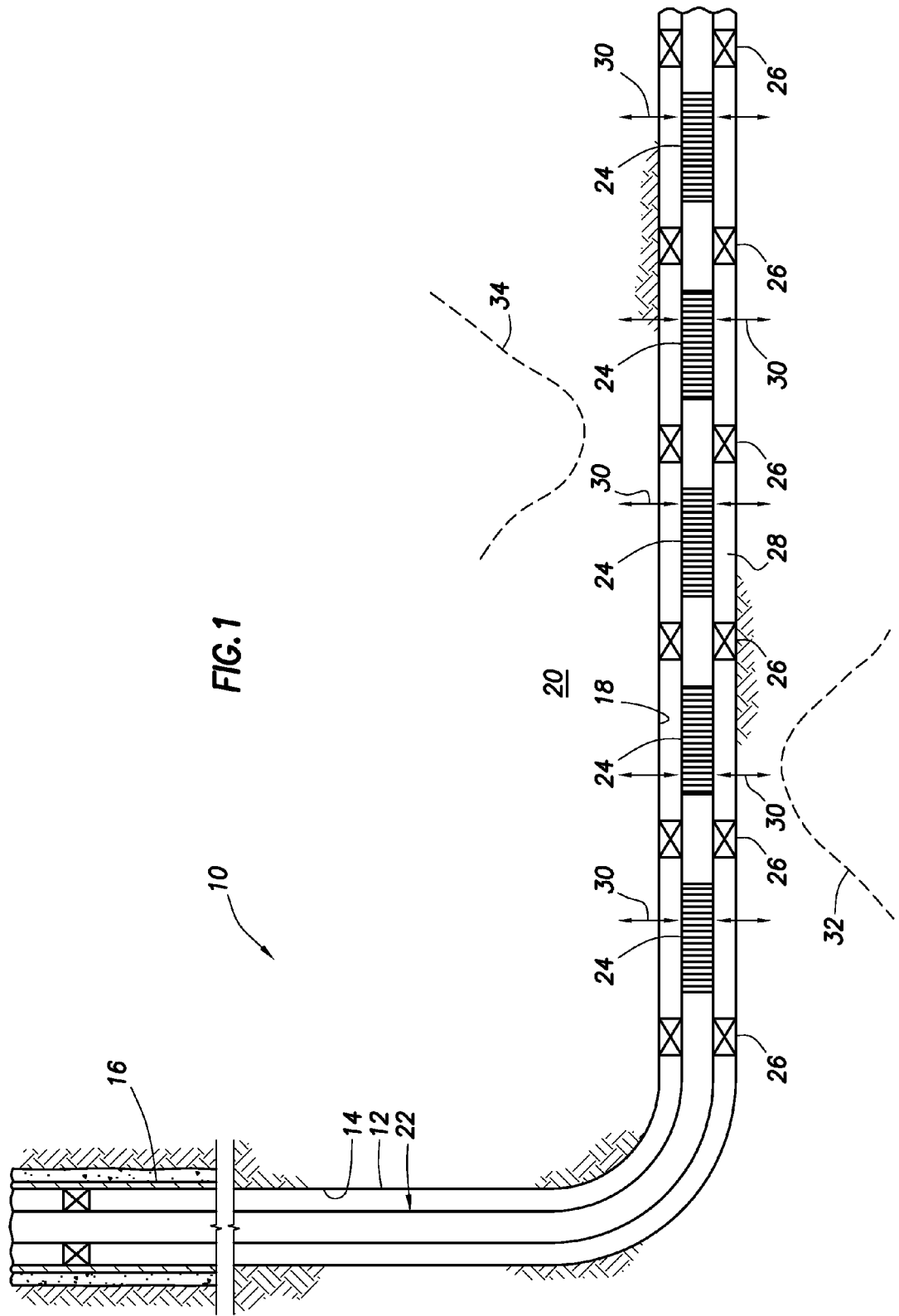
FIG. 1 is a schematic partially cross-sectional view of a well system and associated method which can embody principles of the present disclosure.

Representatively illustrated in FIG. 1 is an example of a well system 10 and associated method which can embody principles of this disclosure. In the well system 10, a generally vertical section 12 of a wellbore 14 has casing 16 lining an upper portion thereof, and a generally horizontal section 18 of the wellbore 14 penetrates an earth formation 20.

A tubular string 22 (such as a production tubing string, coiled tubing, jointed or continuous tubing, etc.) is installed in the wellbore 14. A series of well screens 24 and packers 26 are interconnected alternately along the tubular string 22 in the section 18 of the wellbore 14.

The packers 26 seal off an annulus 28 formed radially between the tubular string 22 and the wellbore 14. In this manner, fluid 30 is constrained to flow between the tubular string 22 and specific divided-off zones or intervals of the formation 20.

The fluid 30 could be injected into the formation 20 in some circumstances (such as, in steam flood, water flood, gas drive, geothermal, stimulation, fracturing, conformance, etc., operations). The fluid 30 could be received from the formation 20 in other circumstances (such as, in hydrocarbon production, geothermal, etc., operations). In still other circumstances, the fluid 30 may be alternately injected and received from the formation 20 (such as, in cyclic steam injection or "huff and puff" operations, etc.).

Production of fluid 30 from the formation 20 can be regulated at each of the individual zones or intervals, in order to balance production, prevent water coning 32 or gas coning 34. For example, flow of the fluid 30 through the well screens 24 can be variably restricted by varying the size of pores in a magnetic shape memory material of each of the well screens 24.

In other examples, the magnetic shape memory material may be used to selectively release a substance into the wellbore 14, or into a flow of the fluid 30, etc. The substance can be retained in the pores of the magnetic shape memory material until it is released by, for example, opening the pores, dissolving or otherwise dispersing the substance, etc.

The substance can be used for preventing flow through the pores, for treating the well (e.g., dissolving mud cake, modifying flow characteristics of the formation 20, etc.), for treating the fluid 30 (e.g., to prevent precipitates from forming in the fluid, for reducing corrosion, for preventing production of harmful fluids (e.g., a biocide for preventing production of hydrogen sulfide, etc.) to the surface, for identifying the interval or zone from which fluid is produced (e.g., the substance could comprise a marker, such as a dye or radioactive material, etc.), etc. Any type of substance may be used with the well screens 24 in keeping with the principles of this disclosure.

In one feature of the well system 10, a magnetic field can be conveniently applied to any of the well screens 24 in the well, thereby changing a pore size of the magnetic shape memory material. The change in pore size can be used to vary a resistance to flow through the well screen 24, to release a substance previously retained in the pores, to permit flow through the well screen, to prevent flow through the well screen, etc.

It should be clearly understood, however, that the well system 10 and associated method is described herein as merely one example of a wide variety of well systems and methods which can benefit from the principles of this disclosure. Therefore, the principles of this disclosure are not limited at all to the details of the well system 10 or any other examples described herein or depicted in the drawings.

Referring additionally now to FIG. 2, an enlarged scale partially cut away elevational view of one of the well screens 24 is representatively illustrated. In this view, it may be clearly seen that this example includes a generally tubular base pipe 36 with openings 38 through its sidewall to permit fluid 30 to flow between the annulus 28 and an interior flow passage 40 (not visible in FIG. 2, see FIG. 3) of the base pipe and tubular string 22.

The well screen 24 also includes a generally tubular sleeve 42 comprising a magnetic shape memory material 44. The material 44 overlies the openings 38, so that fluid 30 which flows through the well screen 24 (e.g., between the flow passage 40 and the annulus 28) also flows through pores of the material.

A filter or other outer shroud 46 outwardly overlies the sleeve 42. As depicted in the figures, the shroud 46 comprises a wire wrapped filter, but a perforated outer sleeve or other type of shroud may be used, if desired. In other examples, the outer shroud 46 may not be used.

The material 44 is positioned between the base pipe 36 and the outer shroud 46 as illustrated in FIG. 2. However, in other examples the material 44 could be otherwise positioned (e.g., within a base pipe, in a sidewall of the base pipe, overlying a filter or other structure, etc.). Thus, it should be clearly understood that the principles of this disclosure are not limited to the specific examples of well screen configurations depicted in the drawings and described herein.

In FIG. 3, an enlarged scale cross-sectional view of the well screen 24 is representatively illustrated. In this view, the manner in which the fluid 30 can flow inwardly and/or outwardly through the well screen can be clearly seen.

Note that the fluid 30 flows through the material 44 when it flows between the annulus 28 and the flow passage 40. In examples described below, the fluid 30 flows through pores of the material 44. Sizes of the pores can be changed by applying a magnetic field to the material 44. However, in other examples, the fluid 30 may not flow through pores of the material.

Figure 4:
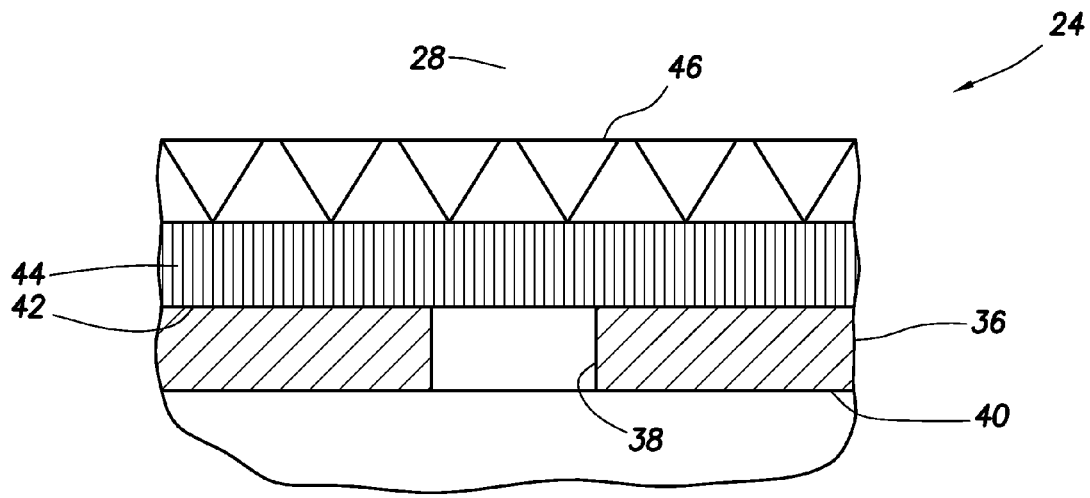
FIG. 4 is another representative cross-sectional view of the well screen.

Referring additionally now to FIG. 4, the well screen 24 is representatively illustrated after a magnetic field has been applied to the well screen. The structure of the material 44 has changed in response to the application of the magnetic field.

The change in the structure of the material 44 can be used to vary a resistance to flow of the fluid 30 through the well screen 24, to release a substance from the material, to treat the wellbore 14, to treat the formation 20, to treat the fluid 30, to open or close the well screen to flow through the well screen, or for other purposes.

Figure 5:
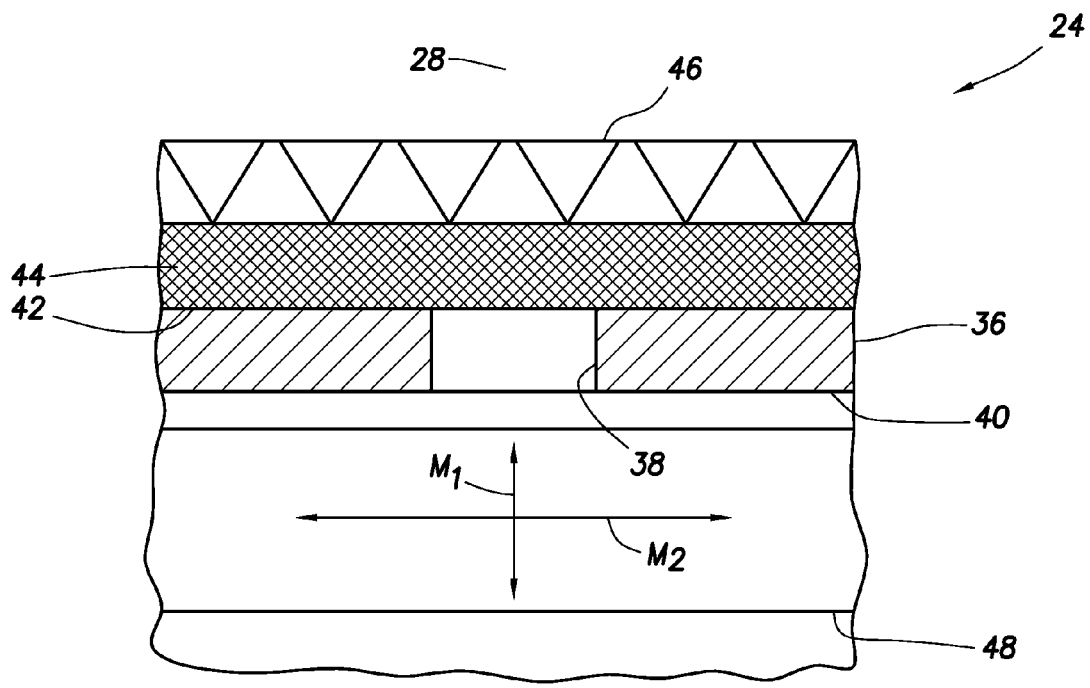
FIG. 5 is a representative cross-sectional view of the well screen with a magnetic tool therein.

Referring additionally now to FIG. 5, a magnetic tool 48 is representatively illustrated in the flow passage 40 of the well screen 24. The tool 48 is used to apply one or more magnetic fields M1, M2 to the well screen 24 to thereby change the structure of the material 44.

A magnetic shape memory material changes shape when a magnetic field is applied to the material. More specifically, a shape of the material changes when the material is exposed to a magnetic field. The material will retain the changed shape when the magnetic field is removed. However, if another magnetic field oriented orthogonal to the first magnetic field is exposed to the material, the material will revert to its original shape.

A suitable material for use as the material 44 in the well screen 24 is a magnetic shape memory foam made of a nickel-manganese-gallium alloy. This type of metal magnetic shape memory foam is described in an article published by the National Science Foundation in 2009 entitled, "Metallic Shape-Memory Foam Shows Giant Response to Magnetic Fields." Another magnetic shape memory foam is described by Müllner, Peter, et al., "Recent Developments in Ni—Mn—Ga Foam Research," Materials Science Forum, vol. 635, pp. 119-124 (Trans Tech Publications, Switzerland, 2010). However, it should be clearly understood that other types of magnetic shape memory materials may be used in keeping with the principles of this disclosure.

It is not necessary for the material 44 to be a metal alloy, or for the material to be a foam. Magnetic particles could be embedded in plastic or another material. Any type of composite material with a magnetic or magnetizable component, ceramics, etc., may be used, as long as the material possesses (or can be "trained" or otherwise altered to possess) magnetic shape memory characteristics.

The magnetic tool 48 can be used to apply either of the orthogonal magnetic fields M1, M2 at any time. For example, the magnetic fields M1, M2, or either of them, could be applied before and/or after the well screen 24 is installed in the wellbore 14.

The magnetic tool 48 could be part of the well screen 24 (e.g., a slidable sleeve which can be selectively shifted to thereby apply the magnetic fields to the material 44, etc.). Alternatively, the tool 48 could be separately conveyed into the well screen 24, for example, by wireline, slickline, electric line, coiled tubing, etc. The tool 48 could be dropped and/or flowed through the passage 40.

The tool 48 could have any shape which is suitable for displacement to or through the well screen 24. The tool 48 could comprise a bar, dart, sleeve, or any other type of structure.

The magnetic fields M1, M2 could be generated by permanent magnets, electromagnets, or by any other source of magnetic energy. The magnetic fields M1, M2 could be applied by switching on an electromagnet, deforming a magnetostrictive material, positioning a magnet in close proximity to the material 44, or by any other method.

The strength of the applied magnetic field can be varied to thereby vary the amount of change in the material 44. The direction of the applied magnetic field can also be varied to vary the amount of change in the material 44.

Figure 6:
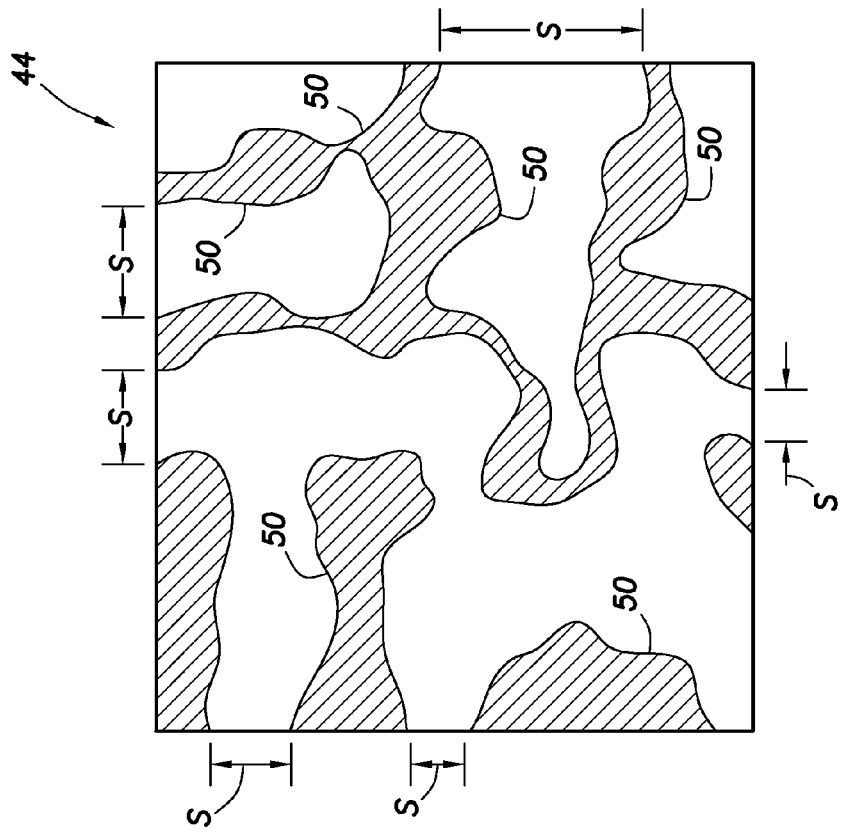
FIGS. 6 & 7 are further enlarged scale cross-sectional views of a magnetic shape memory material.

Referring additionally now to FIG. 6, an enlarged scale cross-sectional view of the material 44 is representatively illustrated. In this view, it may be seen that the material 44 includes pores 50 therein.

Each pore 50 has a size s, such as a height, width, flow area, etc. It is not necessary for all of the pores 50 to have the same size s.

In FIG. 6, the material 44 is depicted in a configuration in which the pore sizes s are relatively small. However, in FIG. 7, the pore sizes s are increased, due to application of a magnetic field to the material 44.

Figure 7:
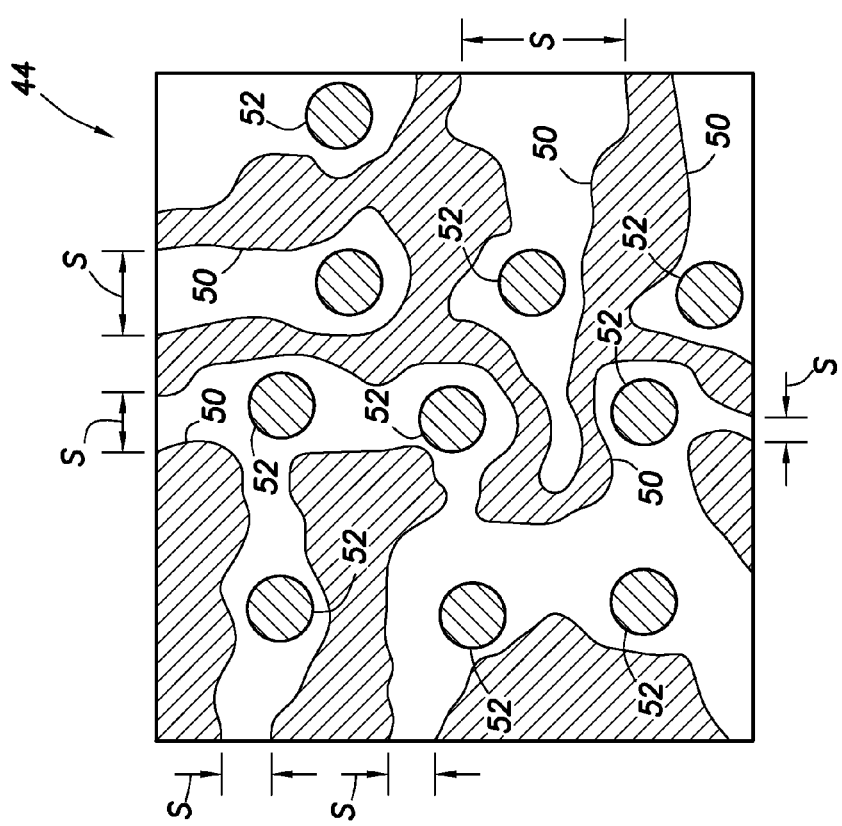

The increased pore size s in the FIG. 7 configuration can reduce the restriction to flow of the fluid 30 through the pores 50. For a given pressure differential across the well screen 24, the material 44 configuration of FIG. 7 will allow for a greater rate of flow of the fluid 30 therethrough, as compared to the configuration of FIG. 6.

In the FIG. 6 configuration, a substance 52 is retained in the pores 50. The substance 52 is depicted as being in solid form in FIG. 6, but it could instead comprise a gel, foam, coating, fluid, liquid, etc., in keeping with the principles of this disclosure.

When the pore sizes s are increased as depicted in the FIG. 7 configuration, the substance 52 is released, thereby permitting increased flow of the fluid 30 through the pores 50. The substance 52 could entirely prevent flow of the fluid 30 through the pores in the FIG. 6 configuration, and release of the substance can then permit flow of the fluid through the pores. In other examples, the substance 52 could be released from the pores, even though the fluid 30 does not flow through the pores.

The substance 52 could comprise a well treatment substance, for example, which acts to dissolve a mud cake lining the wellbore 14, or which alters flow characteristics of the formation 20 (e.g., by increasing a permeability of the formation, etc.).

The substance 52 could comprise a treatment for the fluid 30, for example, to reduce precipitation in the fluid, to reduce emulsification, or to reduce production of harmful fluids (e.g., hydrogen sulfide, etc.).

The substance 52 could block flow through the well screen 24 as it is being installed, while still permitting flow of fluid through the passage 40, thereby preventing plugging of the well screen. After the well screen 24 is installed, the substance 52 can be released to allow flow of the fluid 30 through the well screen.

The substance 52 may be released in a variety of ways. Increasing the sizes s of the pores 50 can allow the substance 52 to physically pass through the pores. The substance 52 could be dissolved or otherwise dispersed more readily when the sizes s of the pores 50 increase. The fluid 30 itself could cause the substance 52 to dissolve or disperse.

Note that it is not necessary for the substance 52 to be present in the pores 50 when the sizes s of the pores are reduced. Such reduction of the pores sizes s could be used to increasingly restrict flow through the well screen 24 without the presence of the substance 52 in the material 44.

Referring additionally now to FIG. 8, an example of a method 54 which may be performed with the well system 10 is representatively illustrated in flowchart form. Of course, the method 54 can be performed with other well systems, in keeping with the principles of this disclosure.

In step 56 of the method 54, the well screen 24 is installed in the wellbore 14. At the time of installation, the pore sizes s may be in their increased or reduced configurations. A magnetic field may be applied to the well screen 24 prior to installation, in order to achieve a desired size s of the pores 50.

In step 58, a magnetic field is applied to the well screen 24. The magnetic field may be applied using the tool 48 described above, or any other means of applying a magnetic field may be used.

In step 60, the pore sizes s change in response to the application of the magnetic field. The change may be an increase in the pore sizes s, for example, to reduce a flow restriction through the well screen 24, to entirely prevent flow through the well screen, to release the substance 52 from the pores 50, etc.

Referring additionally now to FIG. 9, another version of the method 54 is representatively illustrated in flowchart form. In this version, the substance 52 is placed in the pores 50 while they are enlarged, prior to installation of the well screen 24 in the wellbore 14.

In step 62, the pores 50 are open or relatively enlarged, so that the substance 52 can be placed therein. A magnetic field may be applied to the material 44, if needed, to increase the sizes s of the pores 50.

In step 64, the substance 52 (such as a well or fluid treatment, pore blocking substance, etc.) is placed in the pores 50. The substance 52 can be placed in the pores 50 by any means, such as, flowing the substance into the pores and then allowing the substance to set therein, positioning a solid substance in the pores, etc.

In step 66, a magnetic field is applied to the material 44. This reduces the pore sizes s.

In step 68, the substance 52 is retained in the pores 50, due to the reduced sizes s of the pores.

In step 70, the well screen is installed in the well.

In step 72, a magnetic field is applied to the material 44. This increases the sizes s of the pores 50, thereby allowing the substance 52 to be released from the pores. However, this step is optional since, as described above, the substance 52 could be released from the pores 50 (e.g., by dissolving, etc.), without increasing the sizes s of the pores.

Yet another version of the method 54 is representatively illustrated in FIG. 10 in flowchart form. In this version, the pore sizes s are alternately increased and decreased as fluid 30 is alternately injected into, and produced from, the formation 20 in a cyclic steam injection operation.

In step 74, the well screen 24 is installed in the well. The pores 50 may be enlarged or reduced at this time.

In step 76, steam is injected into the formation 20 via the enlarged pores 50. If not already enlarged, the pores 50 are preferably enlarged prior to flowing the steam through the well screen 24.

In step 78, a magnetic field is applied to the well screen 24. This reduces the pores sizes s, and preferably prevents or at least minimizes flow being received from the formation 20 into the tubular string 22 as the steam transfers thermal energy to the formation.

In step 80, fluid 30 is produced from the formation 20 via the pores 50, which are reduced as needed to filter the fluid, to variably restrict flow of the fluid through the well screen, etc.

In step 82, a magnetic field is applied to the well screen 24, thereby increasing the pores sizes s in preparation for another cycle of steam injection. Steps 76-82 are repeated to alternately inject steam into the formation 20 and produce fluid from the formation.

The various versions of the method 54 described above demonstrate that the principles of this disclosure are not limited to the specifics of only one or a few particular examples. Instead, the principles of this disclosure are applicable to a wide variety of different methods.

In certain examples, this disclosure provides to the art a method 54 which can include applying a magnetic field to a well screen 24, thereby varying sizes s of pores 50 via which fluid 30 flows through the well screen 24.

The pores 50 may be formed in a magnetic shape memory material 44 of the well screen 24.

The magnetic field may be applied to the well screen 24 in a well.

The magnetic field may be applied to the well screen 24 prior to installation of the well screen 24 in a well.

A substance 52 may be released from the pores 50 in response to applying the magnetic field.

The substance 52 may comprise a well treatment.

The substance 52 may block flow through the pores 50 prior to being released.

The substance 52 may be released by being dissolved.

The substance 52 may be released by being dispersed.

Applying the magnetic field to the well screen 24 may increase and/or decrease the sizes of the pores 50, after the well screen 24 is installed in a wellbore 14.

Applying the magnetic field to the well screen 24 may comprise alternately increasing and decreasing the sizes s of the pores 50.

The fluid 30 may flow in one direction through the well screen 24 when the sizes s of the pores 50 are increased, and the fluid 30 may flow in an opposite direction through the well screen 24 when the sizes s of the pores 50 are decreased.

Applying the magnetic field may close the pores 50, thereby preventing flow of the fluid 30 through the pores 50.

Applying the magnetic field may open the pores 50, thereby permitting flow of the fluid 30 through the pores 50.

Applying the magnetic field may comprise orienting the magnetic field M1 orthogonal to another magnetic field M2 previously applied to the well screen 24.

Applying the magnetic field may comprise orienting the magnetic field M1 in a direction different from another magnetic field M2 previously applied to the well screen 24. The different direction is not necessarily orthogonal to the direction of the previously applied magnetic field M2.

Applying the magnetic field may comprise variably restricting flow of the fluid 30 through the well screen 24.

Also described by the above disclosure is a well screen 24. The well screen 24 can comprise a magnetic shape memory material 44 having a dimension which changes in response to application of a magnetic field. Restriction to flow through the well screen 24 can vary in response to the change in dimension of the magnetic shape memory material 44. The dimension is not necessarily an outer dimension or total size of the shape memory material 44, but could instead be, e.g., sizes s of the pores 50.

Fluid 30 which flows through the well screen 24 may also flow through pores 50 of the magnetic shape memory material 44.

The well screen 24 may include a substance 52 in the pores 50. The substance 52 may comprise a well treatment. The substance 52 may block flow through the pores 50. The substance 52 may be dissolvable and/or dispersible in a well.

The dimension may be a pore size s of the magnetic shape memory material 44. Application of the magnetic field to the well screen 24 may increase and/or decrease the pore size s. Application of the magnetic field to the well screen 24 may alternately increase and decrease the pore size s.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method, comprising:
    applying a magnetic field to a magnetic shape memory material of a well screen, thereby varying sizes of pores via which fluid flows through the well screen, wherein the varied pore sizes are retained when the magnetic field is no longer applied to the well screen.

2. The method of claim 1, wherein the magnetic field is applied to the well screen in a well.

3. The method of claim 1, wherein the magnetic field is applied to the well screen prior to installation of the well screen in a well.

4. The method of claim 1, wherein a substance is released from the pores in response to applying the magnetic field.

5. The method of claim 4, wherein the substance comprises a well treatment substance.

6. The method of claim 4, wherein the substance blocks flow through the pores prior to being released.

7. The method of claim 4, wherein the substance is released by being dissolved.

8. The method of claim 4, wherein the substance is released by being dispersed.

9. The method of claim 1, wherein applying the magnetic field to the well screen increases the sizes of the pores, after the well screen is installed in a wellbore.

10. The method of claim 1, wherein applying the magnetic field to the well screen decreases the sizes of the pores, after the well screen is installed in a wellbore.

11. The method of claim 1, wherein applying the magnetic field to the well screen comprises alternately increasing and decreasing the sizes of the pores.

12. The method of claim 11, wherein the fluid flows in one direction through the well screen when the sizes of the pores are increased, and the fluid flows in an opposite direction through the well screen when the sizes of the pores are decreased.

13. The method of claim 1, wherein applying the magnetic field closes the pores, thereby preventing flow of the fluid through the pores.

14. The method of claim 1, wherein applying the magnetic field opens the pores, thereby permitting flow of the fluid through the pores.

15. The method of claim 1, wherein applying the magnetic field comprises orienting the magnetic field orthogonal to another magnetic field previously applied to the well screen.

16. The method of claim 1, wherein applying the magnetic field comprises variably restricting flow of the fluid through the well screen.

17. A well screen, comprising:
    a well screen filter element formed from a magnetic shape memory material having a dimension which changes in response to application of first and second magnetic fields,
    wherein the second magnetic field is oriented orthogonal to the first magnetic field.

18. The well screen of claim 17, wherein fluid which flows through the well screen flows through pores of the magnetic shape memory material.

19. The well screen of claim 18, wherein restriction to flow of the fluid through the well screen varies in response to the change in dimension of the magnetic shape memory material.

20. The well screen of claim 18, further comprising a substance in the pores.

21. The well screen of claim 20, wherein the substance comprises a well treatment substance.

22. The well screen of claim 20, wherein the substance blocks flow through the pores.

23. The well screen of claim 20, wherein the substance is dissolvable in a well.

24. The well screen of claim 20, wherein the substance is dispersible in a well.

25. The well screen of claim 17, wherein the dimension is a pore size of the magnetic shape memory material, and wherein application of one of the first and second magnetic fields to the well screen increases the pore size.

26. The well screen of claim 17, wherein the dimension is a pore size of the magnetic shape memory material, and wherein application of one of the first and second magnetic fields to the well screen decreases the pore size.

27. The well screen of claim 17, wherein the dimension is a pore size of the magnetic shape memory material, and wherein application of the first and second magnetic fields to the well screen alternately increases and decreases the pore size.

28. The well screen of claim 17, wherein the dimension is a pore size of the magnetic shape memory material, wherein application of the first magnetic field to the well screen increases the pore size, wherein application of the second magnetic field to the well screen decreases the pore size, and wherein the magnetic shape memory material retains the respective pore size when the first and second magnetic fields are removed.

29. The well screen of claim 17, wherein the magnetic shape memory material retains the respective changed dimension when the first and second magnetic fields are removed.

* * * * *